US010764165B1

(12) United States Patent  
Ye

(10) Patent No.: US 10,764,165 B1  
(45) Date of Patent: *Sep. 1, 2020

(54) EVENT-DRIVEN FRAMEWORK FOR FILTERING AND PROCESSING NETWORK FLOWS

(71) Applicant: Amazon Technologies, Inc., Seattle, WA (US)

(72) Inventor: Shuai Ye, Herndon, VA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

This patent is subject to a terminal disclaimer.

(21) Appl. No.: 15/982,831

(22) Filed: May 17, 2018

Related U.S. Application Data

(63) Continuation of application No. 14/665,683, filed on Mar. 23, 2015, now Pat. No. 9,979,616.

(51) Int. Cl.
*G06F 15/173* (2006.01)
*H04L 12/26* (2006.01)

(52) U.S. Cl.
CPC ............ *H04L 43/06* (2013.01); *H04L 43/04* (2013.01)

(58) Field of Classification Search
CPC ............................... H04L 43/06; H04L 43/04
USPC ........................................................ 709/224
See application file for complete search history.

(56) References Cited

U.S. PATENT DOCUMENTS

| 5,315,586 | A | 5/1994 | Charvillat |
| 6,243,451 | B1 | 6/2001 | Shah et al. |
| 7,020,696 | B1 | 3/2006 | Perry et al. |
| 7,266,595 | B1 | 9/2007 | Black et al. |
| 7,280,529 | B1 | 10/2007 | Black et al. |
| 9,166,992 | B1* | 10/2015 | Stickle ............... H04L 63/1425 |
| 9,569,232 | B1* | 2/2017 | Brandwine ............ G06F 9/455 |
| 9,979,616 | B2* | 5/2018 | Ye .......................... H04L 43/04 |
| 2002/0120741 | A1 | 8/2002 | Webb et al. |
| 2006/0028999 | A1 | 2/2006 | Iakobashvili et al. |
| 2006/0088004 | A1 | 4/2006 | Casey et al. |
| 2006/0089157 | A1 | 4/2006 | Casey et al. |
| 2007/0211697 | A1* | 9/2007 | Noble .................... H04L 43/50 |
| | | | 370/352 |
| 2007/0250930 | A1 | 10/2007 | Aziz et al. |
| 2008/0049638 | A1 | 2/2008 | Ray et al. |
| 2011/0149909 | A1 | 6/2011 | An et al. |
| 2013/0132545 | A1* | 5/2013 | Schultze ................ H04L 41/00 |
| | | | 709/223 |
| 2013/0318238 | A1* | 11/2013 | Hall ....................... H04L 43/04 |
| | | | 709/224 |
| 2014/0019972 | A1 | 1/2014 | Yahalom et al. |
| 2014/0280884 | A1* | 9/2014 | Searle ................. H04L 43/0864 |
| | | | 709/224 |
| 2015/0046507 | A1* | 2/2015 | Saxena ................... H04L 63/20 |
| | | | 709/201 |
| 2015/0081890 | A1* | 3/2015 | Richards ............... H04L 43/08 |
| | | | 709/224 |

(Continued)

*Primary Examiner* — Imad Hussain
(74) *Attorney, Agent, or Firm* — BakerHostetler

(57) ABSTRACT

Time-based groupings of network traffic flow data for virtualized computing resources are stored. Notifications that the time-based groupings are stored are sent, and in response to the notifications, the groupings are processed in accordance with the notifications. Network traffic flow data that is associated with users who have requested publication is published for associated virtualized computing resources.

20 Claims, 9 Drawing Sheets

(56) References Cited

U.S. PATENT DOCUMENTS

| | | | |
|---|---|---|---|
| 2016/0087859 A1* | 3/2016 | Kuan | H04L 41/12 |
| | | | 715/736 |
| 2016/0087861 A1* | 3/2016 | Kuan | H04L 43/065 |
| | | | 709/224 |
| 2017/0262300 A1* | 9/2017 | Brandwine | H04L 29/06877 |
| 2017/0265076 A1* | 9/2017 | Richards | G06Q 20/32 |
| 2019/0281167 A1* | 9/2019 | Richards | H04L 43/08 |
| 2019/0372875 A1* | 12/2019 | Searle | H04L 43/0864 |

\* cited by examiner

US 10,764,165 B1

EVENT-DRIVEN FRAMEWORK FOR FILTERING AND PROCESSING NETWORK FLOWS

CROSS-REFERENCE TO RELATED APPLICATION

This application is a continuation of, and claims priority to, U.S. patent application Ser. No. 14/665,683, filed Mar. 23, 2015 and entitled "EVENT-DRIVEN FRAMEWORK FOR FILTERING AND PROCESSING NETWORK FLOWS", which is incorporated by reference herein in its entirety.

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

Customers of data centers may be provided a wide range of choices with regard to the resources that are selected and how the resources are set up and utilized. Depending on how the resources are set up and utilized, customers may experience different levels of performance for their resources.

BRIEF DESCRIPTION OF THE DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

Figure 1:
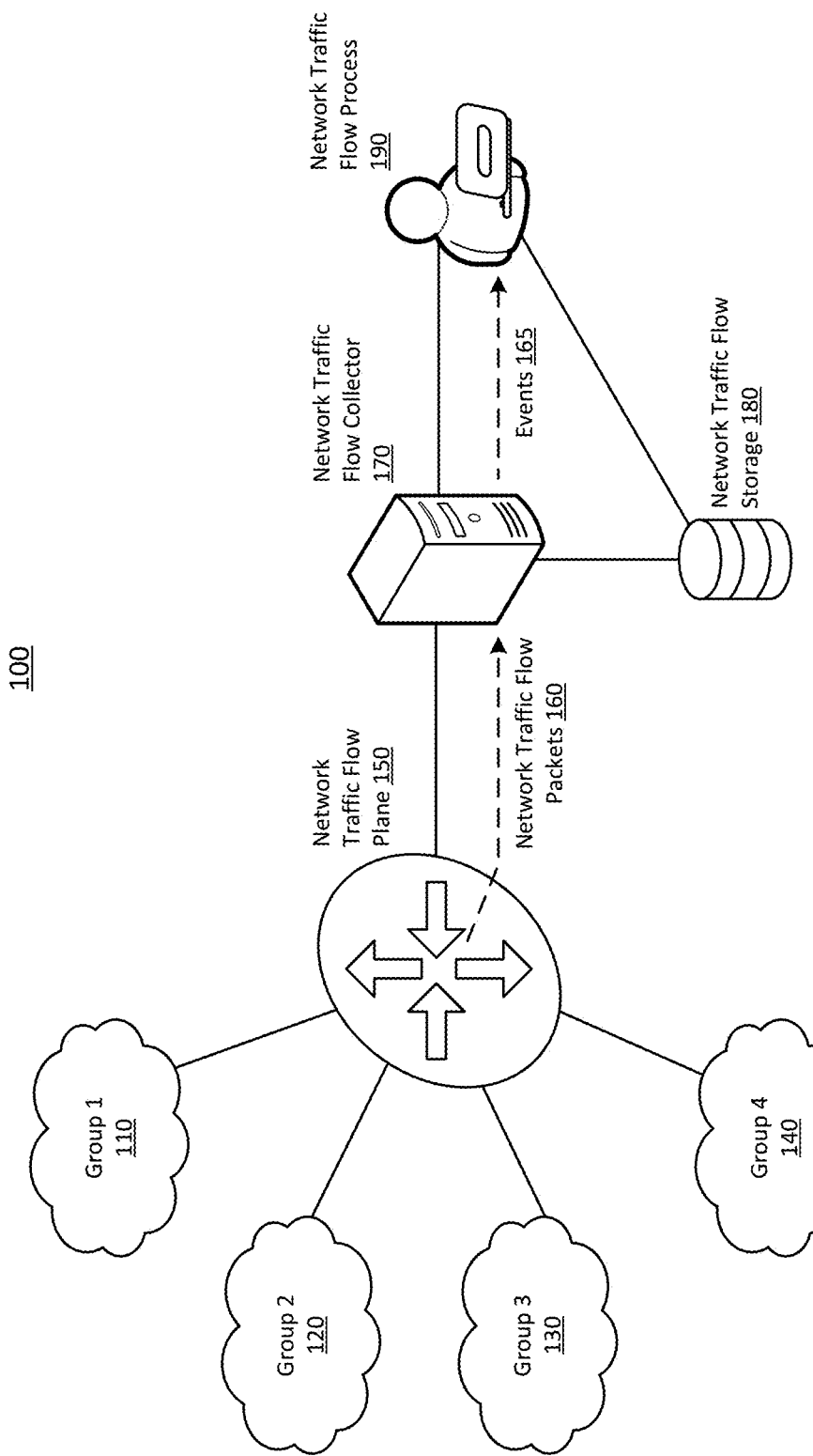
FIG. 1 is a diagram illustrating a mechanism for event-driven processing of network traffic flow information in accordance with the present disclosure.

Embodiments of systems and methods are described for providing access to data in a provider network. For defined units or subsets of computing resources of the provider network, network data flows are captured and stored for selected units of time and during selected time intervals. Event notifications are generated when network data flows for a unit of time are stored and available for processing. In response to one of these events, the provider network may process the stored data for the unit of time and make selected parts of the network data flow data available for requesting customers. As additional network data flows are captured and stored for additional units of time, the event notifications are sent to a queue. The stored data is processed based on the event notifications retrieved from the queue. If a set of stored data cannot be processed or if there is a delay in processing, then the event notifications for that set of stored data can be returned to the queue for processing at a subsequent time.

A service provider, such as an entity that operates a provider network, may offer computing resources such as computing instances and storage resources to customers (who may also be referred to as entities or users). A customer may be any person or entity who accesses computing resources of a service provider. The service provider may, for example, provide a web services platform. Multiple customers may access the web services platform via a computing node and issue instructions to the web services platform. The web services platform may be also be referred to as a multi-tenant web services platform to denote that multiple customers may access the platform. The web services platform may respond to instructions by performing computing operations on one or more of a plurality of computing nodes that make up the web services platform.

Other types of resources may be offered by the provider network. For example, the provider network may provide monitoring and assessment of a customer's instances and other resources and applications running on the resources. Such monitoring and assessment services may generally be referred to herein as resource analysis services. The monitored and assessed information may be useful for collecting and tracking various metrics and providing recommendations regarding system and network architecture, resource utilization, application performance, and operational health of the resources associated with customers. Such information may be useful for keeping instances and applications operating smoothly and efficiently. This information may be analyzed to determine if the customer's resources and their configurations are optimized for their intended use.

Such computing environments are large and complex and include a vast number of interconnected devices with a mix of various types of data flowing through both virtual and physical components. The various computing devices, such as servers and routers, may have complex interactions, and behaviors in one area can affect the performance of the entire computing environment. In many cases, customers may have hundreds or thousands of instances, and it may be difficult for a customer to ascertain how to assess the customer's configuration and architecture and how various metrics may be impacted by network configuration and architecture decisions.

In many cases, customers of the provider network may be interested in network traffic flow information. The provider network may, for example, collect IP network traffic as data enters or exits a selected interface of a defined network boundary. The network traffic flow information may be useful to analyze network traffic flow and volume to determine sources and destinations of data traffic as well as the volume of data traffic being generated. The provider network may execute one or more functions to collect IP traffic statistics on selected interfaces and store the data for network traffic analysis. Network traffic flow information can include data packets that include the ingress interface, source IP address, destination IP address, source port, destination port, and egress interface.

The amount of network traffic flow information that is generated for a given set of computing resources can be significant. For example, for a given droplet or other defined unit of computing capacity, the provider network may want to filter out unwanted data flows and identify flows requested by the customers. Because of the significant volume of data and the amount of processing for providing the requested flows, the stored network traffic flow information may not be processed in time to keep up with the data as it is collected, especially using a polling approach where the processing component continuously polls to determine if captured network traffic flow information is available to be processed.

The present disclosure describes systems and methods for an event-driven approach to processing network traffic flow information that avoids polling and allows for processing of captured network traffic flow information without loss of data and information. By using an event-driven approach, the systems responsible for processing the network traffic flow information can be notified when stored network traffic flow information is available to be processed. A number of notifications can be provided for a succession of groupings of network traffic flow information so that the processing workflows can process the groupings of network traffic flow information in a queued fashion. If an issue or problem arises that prevents processing of a grouping of network traffic flow information, then that grouping can be dropped and processing can continue with the next grouping. Dropped groupings may be revisited at a later time for additional processing attempts to ensure that all captured data is processed.

In some embodiments, the processing workflow can access the queue of notifications to determine if any dropped groupings need to be processed. Alternatively, the processing workflow can analyze stored information to determine if any dropped groupings need to be processed. Use of event-driven processing of network traffic flow information can thus allow for more complete processing of network traffic flow information in a computing environment with significant computing resources without loss or dropping of data, and allows for the processing workflows to process the data as fast as practicable under current conditions of the computing environment.

In some embodiments, the processed network traffic flow information may be provided to requesting customers, who may access the network traffic flow information relevant to their allocated computing resources. The described event-driven process can be useful in cases where a customer sets up a security rule or other configurations incorrectly, preventing the processing workflows to complete data publishing tasks for the customer. Such incomplete events may be queued for repeated attempts at a later time, thus providing the possibility of fulfilling the customer's data request without loss.

In some embodiments, a grouping of data may be referred to as a parcel or bucket of data, which may include network traffic flow information for a discrete defined set of computing resources such as a droplet in a virtualized computing environment. In such a scenario, a parcel or bucket of data for a droplet may include network traffic flow information collected for a ten minute period, for example. The network traffic flow information may be collected at defined time intervals (e.g., every minute).

FIG. 1 is a diagram illustrating an example system for providing event-driven processing of network traffic flow information accordance with the present disclosure. In FIG. 1, system 100 for providing computing resources is described according to an embodiment. System 100 may be implemented, for example, in one or more data centers as described herein. System 100 may include groups of computing resources that may include a number of virtual and physical resources. For example, computing instances may be configured to provide virtual computing services to a computer user of a public network via a gateway. For example, virtual computing services may provide a set of remote access enterprise applications to a group of users who may, for example, be employees of an enterprise customer. It will be appreciated that some embodiments may involve additional resources that are not illustrated in the figure.

FIG. 1 also illustrates network traffic flow plane 150 and network traffic flow packets 160. Network traffic flow collector 170 may facilitate the storage of the network traffic flow packets 160 in network traffic flow storage 180. When a determined time period has lapsed, or when some other indication of measurement has occurred, events 165 may be sent to network traffic flow process 190.

Figure 2:
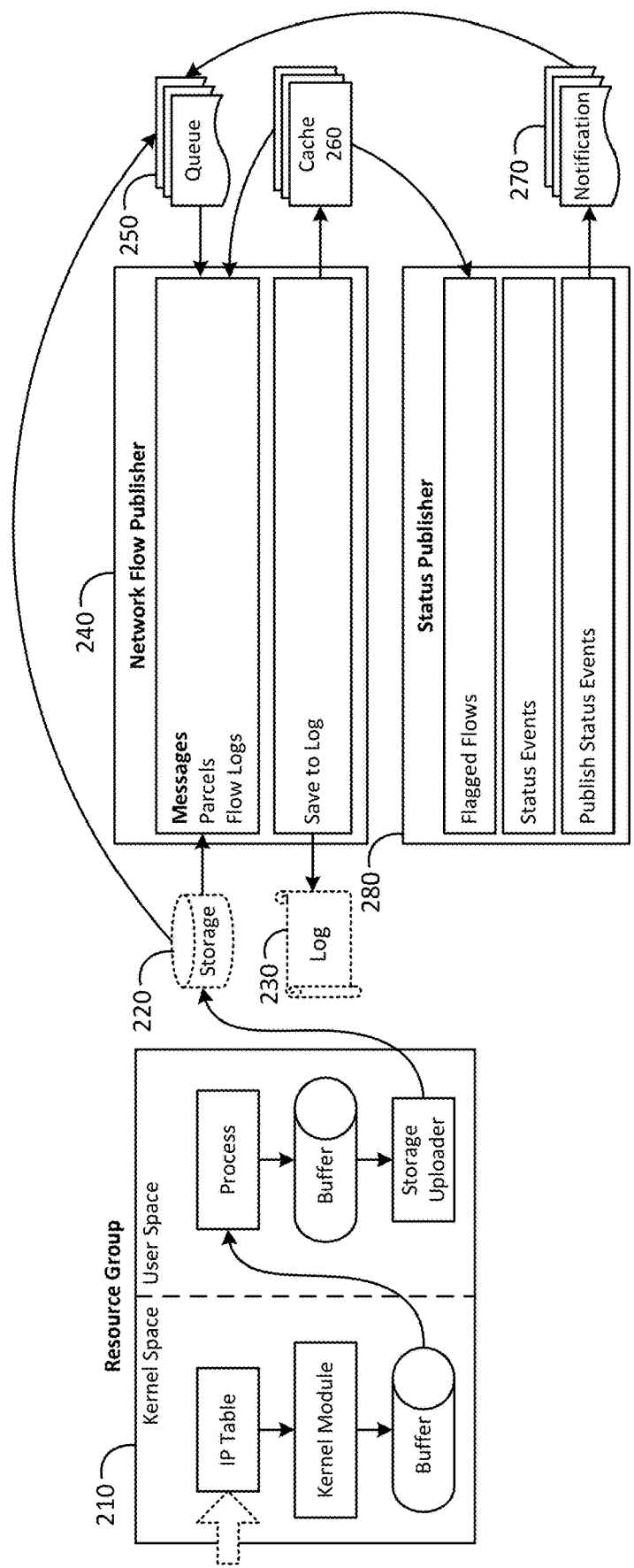
FIG. 2 is a diagram illustrating a mechanism for event-driven processing of network traffic flow information in accordance with the present disclosure.

FIG. 2 is a diagram illustrating one example system for providing event-driven processing of network traffic flow information according to one embodiment. FIG. 2 illustrates a resource group 210 that is subject to monitoring and capturing of network traffic flow information. In one embodiment, data traffic for the resource group may be processed by components and applications running in kernel space and user space. For example, rules for the treatment of packet may be implemented by a kernel module and packets may be stored in a buffer. Applications running in user space may process the stored packets and the processes packets may be placed in a buffer for uploading to a storage 220. FIG. 2 also illustrates network flow publisher 240 that is configured to receive events from queue 250 that have been provided by status publisher 280 indicating that data is available for processing. The network flow publisher 240 accesses parcels from storage 220 for processing in storage 220. In an embodiment, storage 220 may be configured to send events indicating that data is available for processing. The network flow publisher 240 also accesses customer information to determine which customers have enabled publication of network traffic flow information. In one embodiment, the network flow publisher 240 may be configured to retrieve data from cache 260 to determine which information has been requested by customers, determine which information is requested by customers, parse the data in the parcel according to customers and customers' information, identify specific data that matches customers' requests, and store the identified data in log 230.

Figure 3:
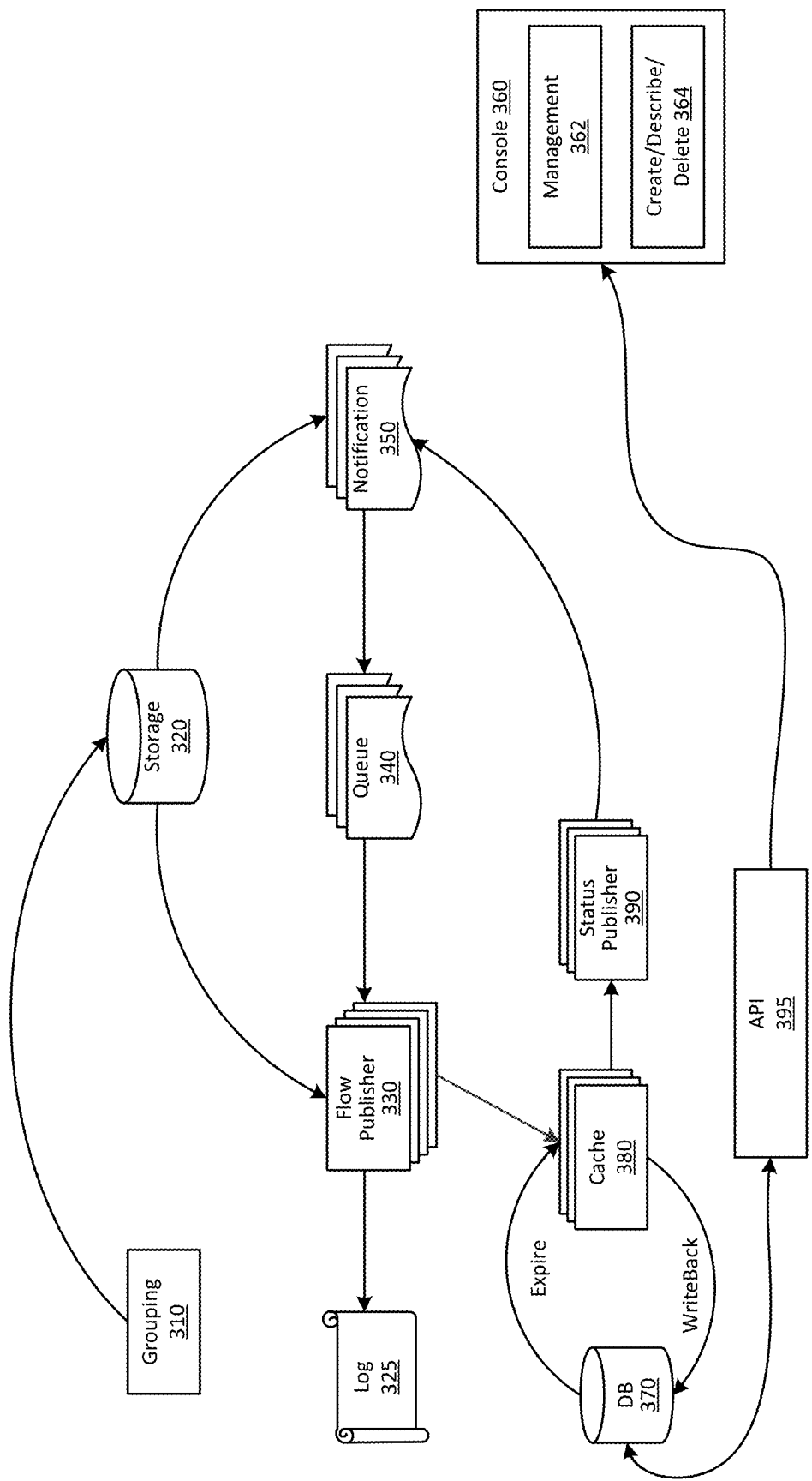
FIG. 3 is a diagram illustrating a mechanism for event-driven processing of network traffic flow information in accordance with the present disclosure.

FIG. 3 is a diagram illustrating the data flows in an example system for providing event-driven processing of network traffic flow information according to one embodiment. FIG. 3 illustrates that data from a grouping 310 of resources is stored in a storage 320. At a selected notification point or other criterion, an event is sent to notification engine 350. Notification engine 350 sends a notification to queue 340 that storage 320 may be accessed for stored network traffic flow information. Flow publisher 330 may be configured to access queue 340 and access log 325 for recording tags for network traffic flow information. FIG. 3 also illustrates flow publisher 330 and network status publisher 390 that receive information from cache 380 regarding customer configuration information that is stored in database 370. The customer configuration information may be received as information from an application programming interface (API) 395 that exposes an interface to console 360 that includes a management component 362 and a create/describe/delete component 364.

Figure 4:
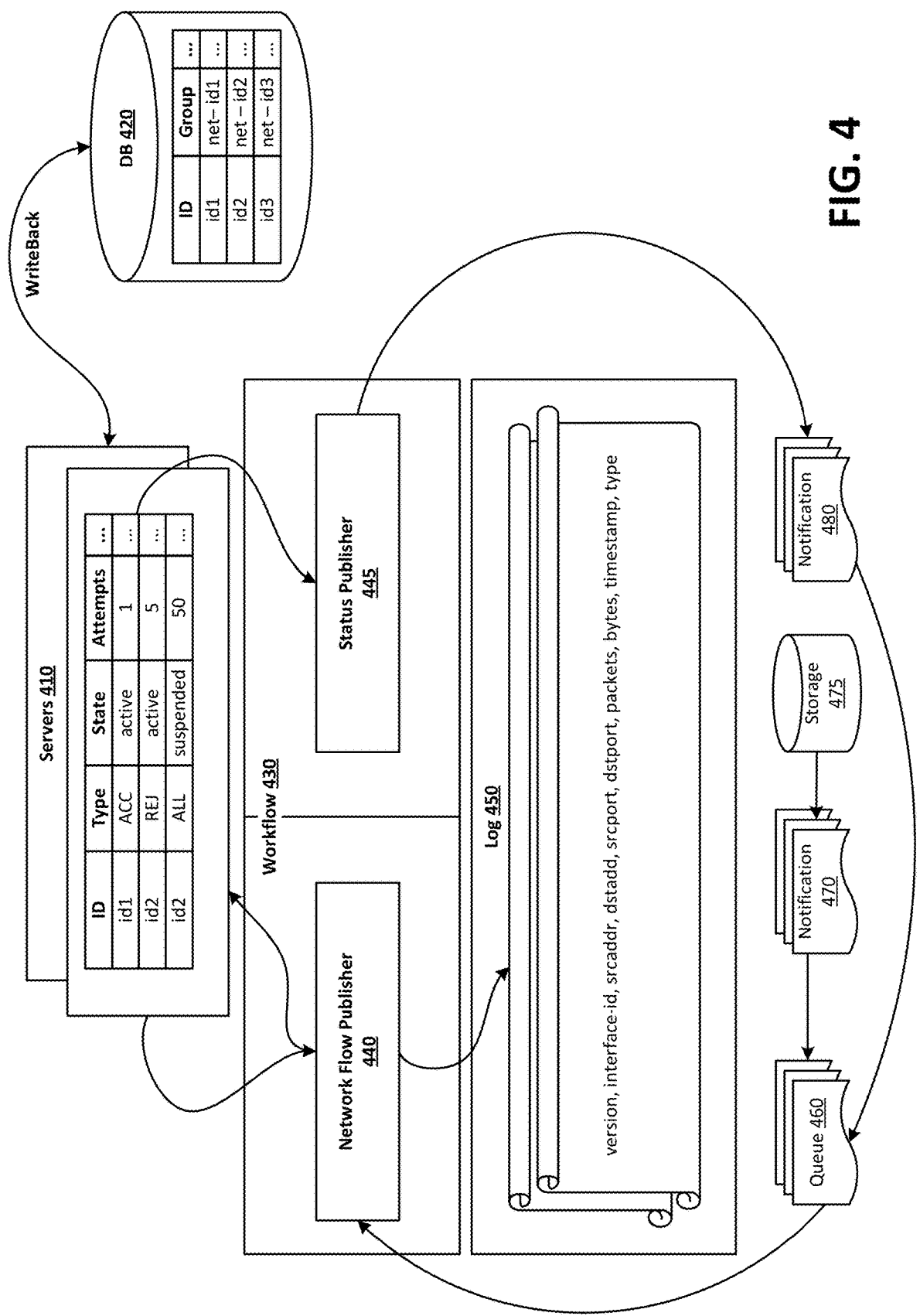
FIG. 4 is a diagram illustrating a mechanism for event-driven processing of network traffic flow information in accordance with the present disclosure.

FIG. 4 is a diagram adding further detail to the example system for providing event-driven processing of network traffic flow information according to one embodiment. FIG. 4 illustrates example data records stored in servers 410 for customer configuration and requests that are stored in database 420. The data records may include identifiers for the records, a type that indicates whether accepted traffic, rejected traffic, or all traffic should be flagged, the state of a request (e.g., active or suspended), number of attempts, and other information if implemented. The data records are available to workflow 430, which includes network flow publisher 440 that is configured to maintain log 450. The network traffic flow data stored in log 450 may include version, interface identifier, source address, destination address, source port, destination port, packets, bytes, timestamp, and type of traffic Workflow 430 also includes status publisher 445 for providing notifications 480. Notifications 470 may be generated by storage 475 as buckets or parcels of network traffic flow data are stored in storage 475.

In an example use case, the described system for providing event-driven processing of network traffic flow information may be used to expose network traffic being accepted and/or rejected for the requesting customers via system monitoring logs. For example, the system for providing event-driven processing of network traffic flow information may employ an IP address table and generate log data on packets that have been accepted or rejected. The system may capture these packets at a defined time interval and send the packets to a storage bucket or parcel at a larger time interval for further processing. An aggregation workflow, such as network flow publisher 440 of FIG. 4, may filter out unwanted log data and select and transmit the relevant traffic information. The aggregation workflow may extract the customer-specified traffic type(s) from the parcels for a virtual private cloud, a subnet, or some other defined unit of computing and/or network capacity.

The network flow publisher 440 may be configured to be triggered by event notifications such as notifications 470 of FIG. 4. Upon receiving a notification event, network flow publisher 440 may access the associated network traffic flow information parcel from storage and generate a log such as log 450 of FIG. 4 for the parcel. The log may be provided to a monitoring and reporting function via an application programming interface (API) such as API 395 of FIG. 3 if the customer associated with the network traffic flow information has enabled publication of the flow log, the publishing permissions are correctly configured, and other restrictions are not active. If there is no network traffic flow information for a given parcel, then network flow publisher 440 may provide an indication that there is no traffic information to report.

Figure 5:
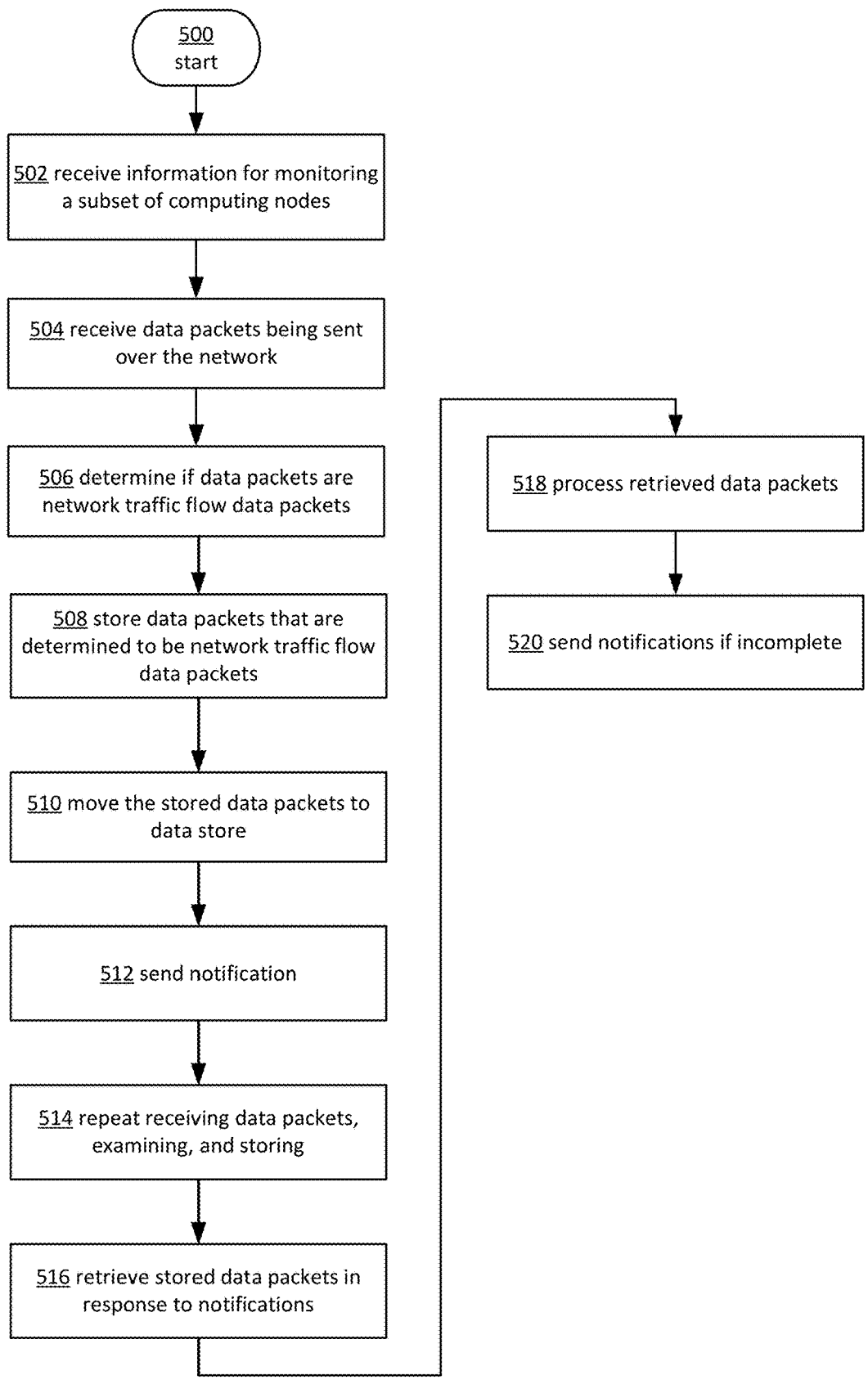
FIG. 5 is a flowchart depicting an example procedure for event-driven processing of network traffic flow information in accordance with the present disclosure.

FIG. 5 illustrates an example operational procedure for providing access to data in a provider network configured to provide virtualized computing services implemented on networked computing resources to customers of a provider network. In an embodiment, event-driven processing of network traffic flow information is implemented by the operations illustrated in FIG. 5, which begins with operation 500 to start the operational procedure. The procedure can be implemented for a plurality of computing nodes communicating over a network. A computing node can comprise a plurality of virtual machines. Operation 500 may be followed by operation 502. Operation 502 illustrates receiving information for monitoring a subset of the computing nodes. The subset may be defined, for example, based on customers of the provider network who have requested access to network traffic flow information for their allocated computing resources. The subset may also be defined by the provider network as computing nodes that are to be monitored for network traffic flow information for subsequent analysis.

Operation 502 may be followed by operation 504. Operation 504 illustrates receiving data packets being sent over the network. In some embodiments, data packets in the network control plane are received. In other embodiments, data packets being transmitted across the network are received. Operation 504 may be followed by operation 506. Operation 506 illustrates examining the data packets to determine if the data packets are network traffic flow data packets entering or exiting one of the subset of computing nodes. Operation 506 may be followed by operation 508, which illustrates storing data packets that are determined to be network traffic flow data packets entering or exiting the one computing node of the subset. In some embodiments, operations 502, 504, and 506 are performed during a predetermined time interval. For example, the network traffic flow data packets may be stored at one minute intervals.

Operation 508 may be followed by operation 510. Operation 510 illustrates moving the stored data packets to a data store after a predetermined time period. For example, the stored data packets may be moved to a data store every ten minutes. Operation 510 may be followed by operation 512. Operation 512 illustrates sending a notification to one or more queues when the stored data packets are moved to the data store. For example, referring to FIG. 3, notification engine 350 may send a notification to queue 340 that storage 320 may be accessed for stored network traffic flow information. In some embodiments, the one or more queues can be implemented as a distributed queue. Operation 512 may be followed by operation 514. Operation 514 illustrates repeating said receiving data packets, examining, and storing for subsequent predetermined time periods. For example, operations 504 through 512 may be repeated at ten minute intervals or other time interval as configured by the provider network. Operation 514 may be followed by operation 516. Operation 516 illustrates retrieving the queued notifications from the one or more queues and accessing the data packets in the data store in accordance with the queued notifications. For example, referring to FIG. 4, network flow publisher 440 may be configured to be triggered by event notifications such as notifications 470. Upon receiving a notification event, network flow publisher 440 may access the associated network traffic flow information parcel from storage and generate a log such as log 450 of FIG. 4 for the parcel. The notifications in the queue may be processed in first-in/first-out fashion so that the stored parcels of data may be processed in order. In some embodiments, if the one or more queues are implemented as a distributed queue, then the notifications can be retrieved from one of the queues and processed.

Operation 516 may be followed by operation 518. Operation 518 illustrates processing the retrieved data packets to identify network traffic flow data that is to be provided to a programmatic interface. Operation 518 may be followed by operation 520. Operation 520 illustrates sending notifications to the one or more queues for stored data packets for which said processing was not completed. For example, some network traffic flow data may be prevented from being published because a customer may have prevented due to security settings as configured for the customer's data. By keeping notifications in the queue for stored data packets that have not completed processing, repeated attempts to complete the processing can be made until processing can be completed or a maximum timeout is reached.

In some embodiments, the data traffic may include network traffic flow data. Additionally, the access may be provided by a publisher component configured to filter and publish the identified data traffic to the indicated customers. The notification may be sent by a status publisher component configured to receive indications that the captured data traffic is stored in the data store and send the notification to the publisher component. The data store may be a persistent storage resource configured to store the captured data traffic.

Figure 6:
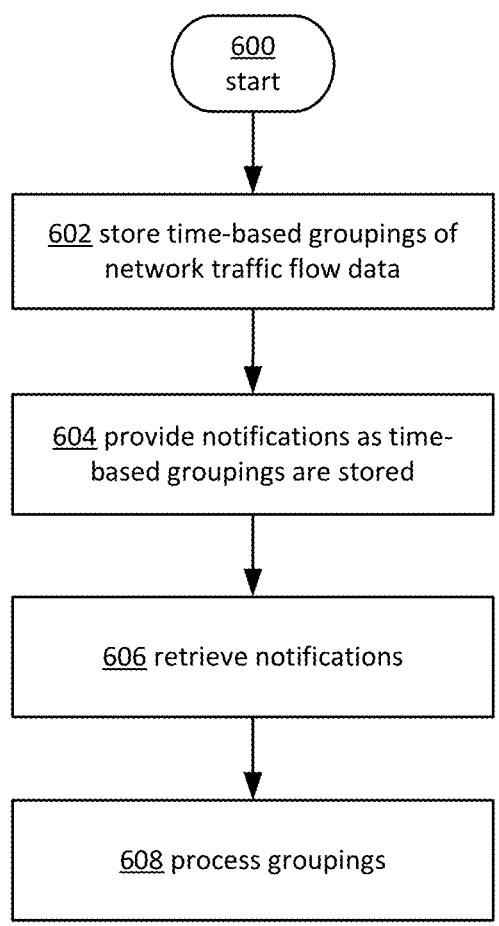
FIG. 6 is a flowchart depicting an example procedure for event-driven processing of network traffic flow information in accordance with the present disclosure.

FIG. 6 illustrates an example operational procedure for providing access to data in a provider network allocating virtualized computing resources to customers of the provider network. In an embodiment, event-driven processing of network traffic flow information is implemented by the operations illustrated in FIG. 6, which begins with operation 600 to start the operational procedure. Operation 600 may be followed by operation 602. Operation 602 illustrates storing time-based groupings of network traffic flow data for the virtualized computing resources.

Operation 602 may be followed by operation 604. Operation 604 illustrates providing notifications as the time-based groupings are stored. Operation 604 may be followed by operation 606, which illustrates retrieving one or more of the notifications. Operation 606 may be followed by operation 608, which illustrates processing the time-based groupings identified in the notifications. The processing operation may include identifying and publishing network traffic flow data that is associated with customers who have requested publication of the network traffic flow data for associated virtualized computing resources.

In some embodiments, the time-based groupings are determined based on consecutive time slots defined by the provider network. The time-based groupings may be stored based on selected subsets of the virtualized computing resources. The time-based groupings of network traffic flow data may be stored in a persistent storage resource configured to store the captured data traffic. Additionally, the selected subsets of the virtualized computing resources may be units of virtualized computing capacity.

In some embodiments, the notifications are stored and retrieved from one or more queues. The processing may include data traffic being accepted or rejected. The publishing may include making the processed network traffic flow available to a monitoring service for the virtualized computing resources, a network flow analyzer, or a customer-defined storage. The publishing may be performed by a publisher component configured to filter and publish the network traffic flow data to the associated customers.

In some embodiments, the selected subsets include a virtual private network, a subnet, or a virtual network interface. Furthermore, the notifications may be provided by a status publisher component configured to receive indications that the captured network traffic flow is stored and send the notifications to the publisher component.

It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 7:
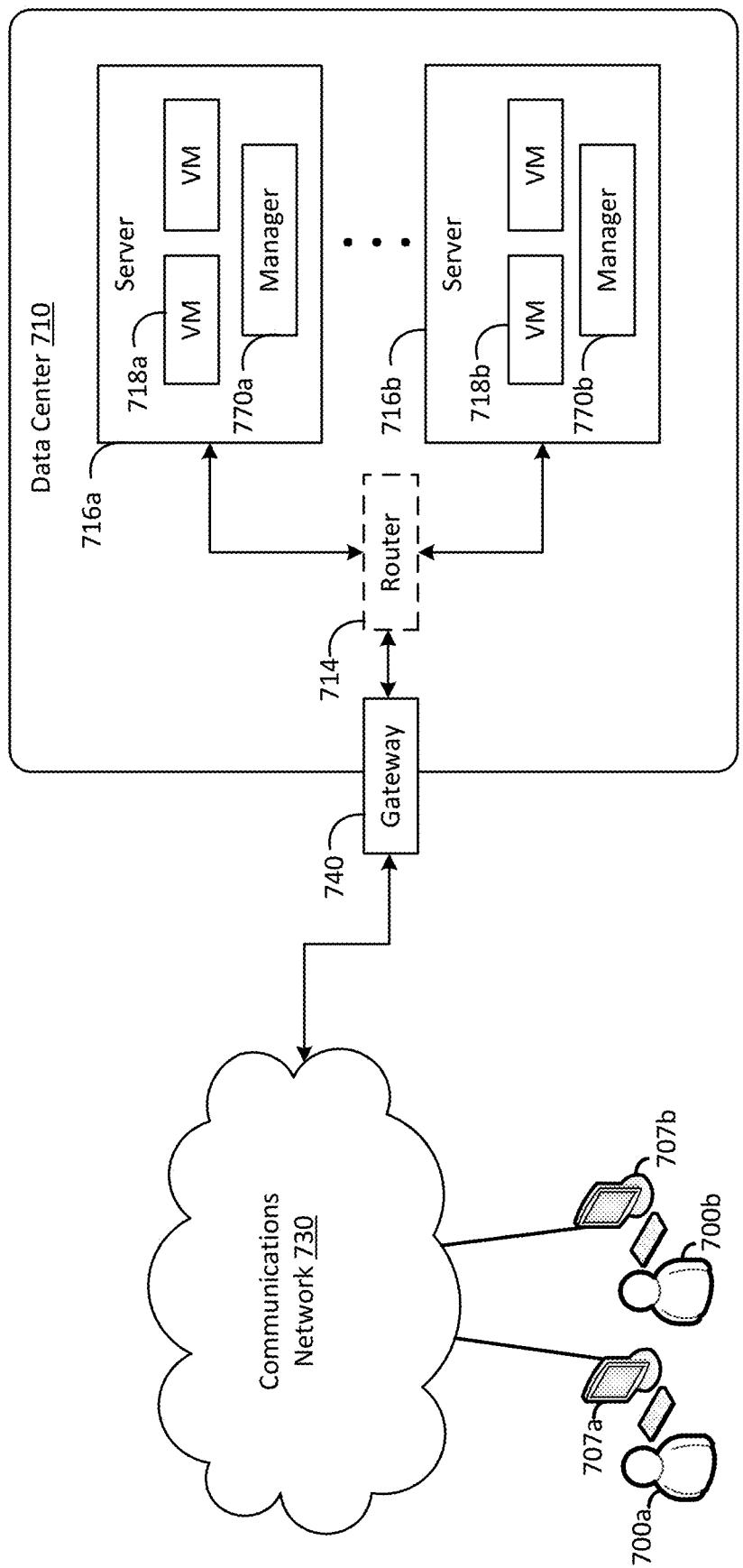
FIG. 7 is a diagram illustrating an example computer environment that may be used in some embodiments.

FIG. 7 illustrates an example computing environment in which the embodiments described herein may be implemented. FIG. 7 is a diagram schematically illustrating an example of a data center 710 that can provide computing resources to users 700a and 700b (which may be referred herein singularly as "a user 700" or in the plural as "the users 700") via user computers 707a and 707b (which may be referred herein singularly as "a computer 707" or in the plural as "the computers 707") via a communications network 730. Data center 710 may be configured to provide computing resources for executing applications on a permanent or an as-needed basis. The computing resources provided by data center 710 may include various types of resources, such as data processing resources, data storage resources, data communication resources, and the like. Each type of computing resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as web servers and/or one large processing resource as a database server, for example.

Data center 710 may include servers 716a and 716b (which may be referred herein singularly as "a server 716" or in the plural as "the servers 716") that provide computing resources available as virtual machine instances 718a and 718b (which may be referred herein singularly as "a virtual machine instance 718" or in the plural as "the virtual machine instances 718"). The virtual machine instances 718 may be configured to execute applications, including web servers, application servers, media servers, database servers, and the like. Other resources that may be provided include data storage resources (not shown) and may include file storage devices, block storage devices, and the like.

Referring to FIG. 7, communications network 730 may, for example, be a publicly accessible network of linked networks and possibly operated by various distinct parties, such as the Internet. In other embodiments, communications network 730 may be a private network, such as, for example, a corporate or university network that is wholly or partially inaccessible to non-privileged users. In still other embodiments, communications network 730 may include one or more private networks with access to and/or from the Internet.

Communications network 730 may provide access to computers 707. Computers 707 may be computers utilized by customers 700 or other customers of data center 710. For instance, user computer 707a or 707b may be a server, a desktop or laptop personal computer, a tablet computer, a wireless telephone, a personal digital assistant (PDA), an e-book reader, a game console, a set-top box, or any other computing device capable of accessing data center 710. User computer 707a or 707b may connect directly to the Internet (e.g., via a cable modem or a Digital Subscriber Line (DSL)). Although only two user computers 707a and 707b are depicted, it should be appreciated that there may be multiple user computers.

User computers 707 may also be utilized to configure aspects of the computing resources provided by data center 710. In this regard, data center 710 might provide a web interface through which aspects of its operation may be configured through the use of a web browser application program executing on user computer 707. Alternatively, a stand-alone application program executing on user computer 707 might access an application programming interface (API) exposed by data center 710 for performing the configuration operations. Other mechanisms for configuring the operation of the data center 710, including deploying updates to an application, might also be utilized.

Servers 716a and 716b shown in FIG. 7 may be standard servers configured appropriately for providing the computing resources described above and may provide computing resources for executing one or more applications. In one embodiment, the computing resources may be virtual machine instances 718. In the example of virtual machine instances, each of the servers 716 may be configured to execute an instance manager 770a or 770b (which may be referred herein singularly as "an instance manager 770" or in the plural as "the instance managers 770") capable of executing the virtual machine instances. The instance managers 770 may be a virtual machine monitor (VMM) or another type of program configured to enable the execution of virtual machine instances 718 on servers 716, for example. As discussed above, each of the virtual machine instances 718 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 710 shown in FIG. 7, a router 714 may be utilized to interconnect the servers 716a and 716b. Router 714 may also be connected to gateway 740, which is connected to communications network 730. Router 714 may manage communications within networks in data center 710, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 710 described in FIG. 7 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The provider network may be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts, and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Figure 8:
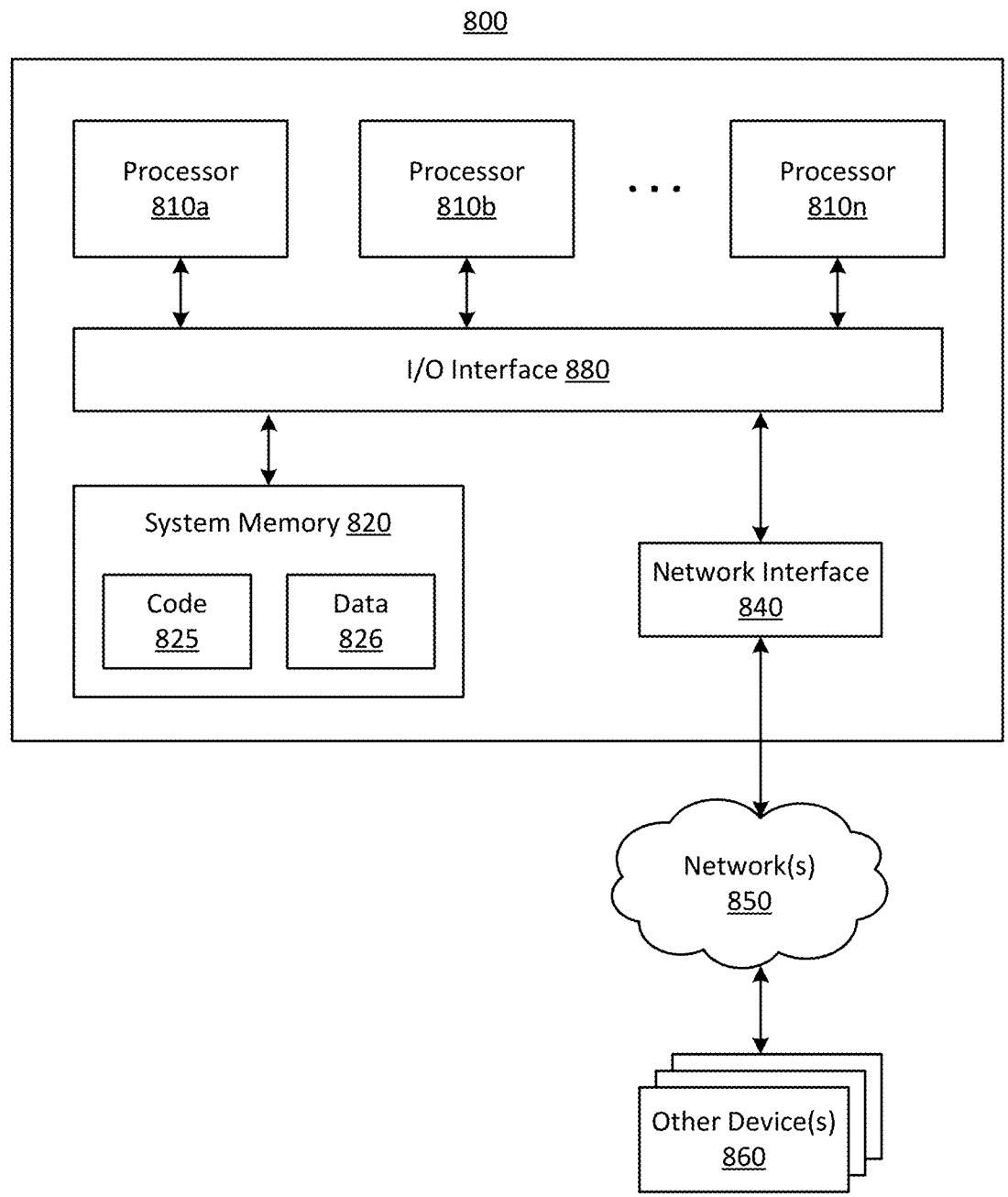
FIG. 8 is a diagram illustrating an example computer system that may be used in some embodiments.

In at least some embodiments, a computing device that implements a portion or all of one or more of the technologies described herein, including the techniques to implement the functionality of a system for event-driven processing of network traffic flow information may include a general purpose computer system that includes or is configured to access one or more computer-accessible media. FIG. 8 illustrates such a general-purpose computing device 800. In the illustrated embodiment, computing device 800 includes one or more processors 810a, 810b, and/or 810n (which may be referred herein singularly as "a processor 810" or in the plural as "the processors 810") coupled to a system memory 820 via an input/output (I/O) interface 880. Computing device 800 further includes a network interface 840 coupled to I/O interface 880.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 820 as code 825 and data 826.

In one embodiment, I/O interface 880 may be configured to coordinate I/O traffic between processor 810, system memory 820, and any peripheral devices in the device, including network interface 840 or other peripheral interfaces. In some embodiments, I/O interface 880 may perform any necessary protocol, timing, or other data transformations to convert data signals from one component (e.g., system memory 820) into a format suitable for use by another component (e.g., processor 810). In some embodiments, I/O interface 880 may include support for devices attached through various types of peripheral buses, such as a variant of the Peripheral Component Interconnect (PCI) bus standard or the Universal Serial Bus (USB) standard, for example. In some embodiments, the function of I/O interface 880 may be split into two or more separate components, such as a north bridge and a south bridge, for example. Also, in some embodiments some or all of the functionality of I/O interface 880, such as an interface to system memory 820, may be incorporated directly into processor 810.

Network interface 840 may be configured to allow data to be exchanged between computing device 800 and other device or devices 860 attached to a network or network(s) 850, such as other computer systems or devices as illustrated in FIGS. 1 through 8, for example. In various embodiments, network interface 840 may support communication via any suitable wired or wireless general data networks, such as types of Ethernet networks, for example. Additionally, network interface 840 may support communication via telecommunications/telephony networks, such as analog voice networks or digital fiber communications networks, via storage area networks, such as Fibre Channel SANs or via any other suitable type of network and/or protocol.

In some embodiments, system memory 820 may be one embodiment of a computer-accessible medium configured to store program instructions and data as described above for FIGS. 1 and 2 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 800 via I/O interface 880. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager. Such an interface may include capabilities to allow browsing of a resource catalog and details and specifications of the different types or sizes of resources supported and the different reservation types or modes supported, pricing models, and so on.

Figure 9:
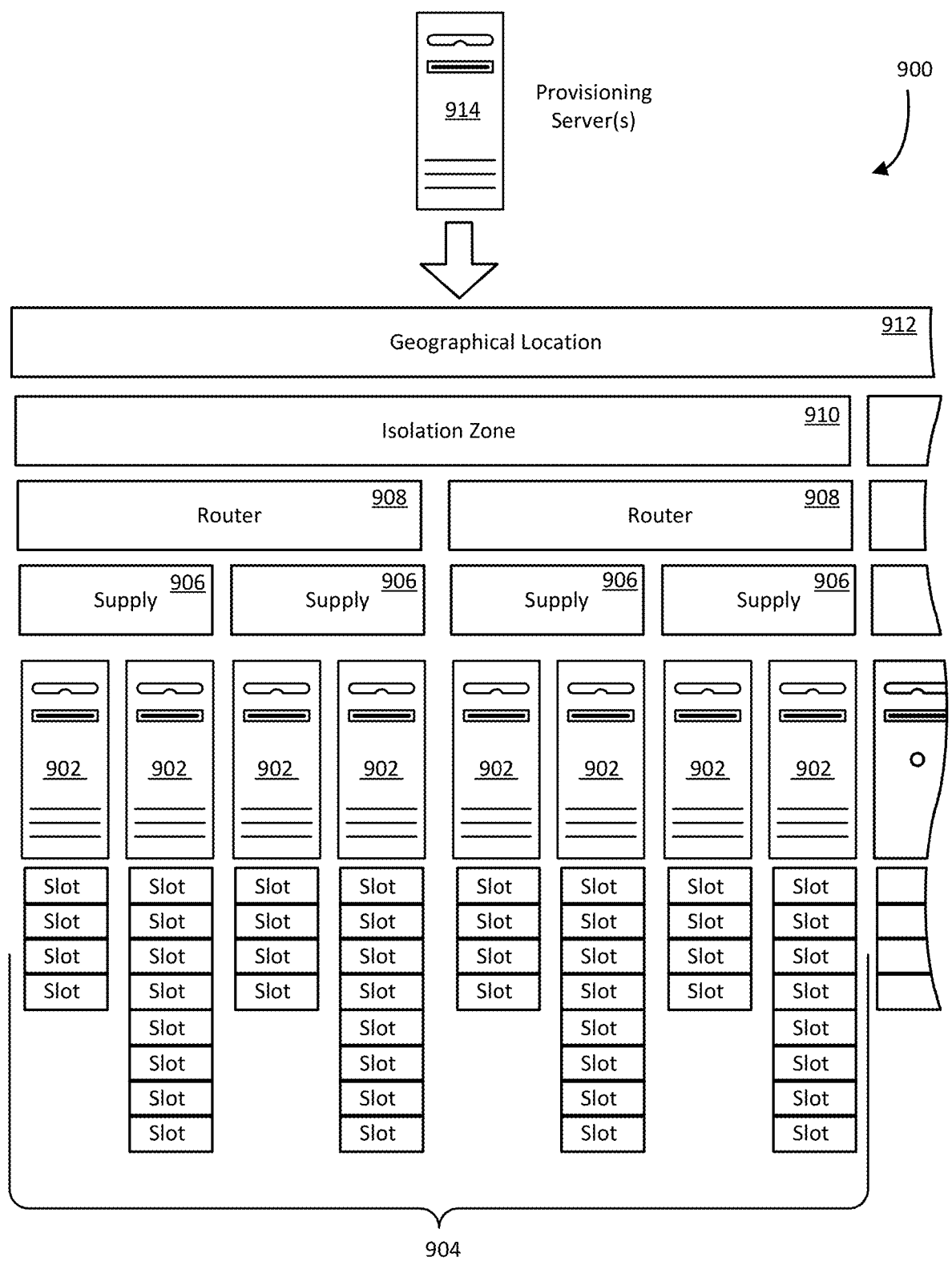
FIG. 9 is a diagram illustrating an example computer environment that may be used in some embodiments.

In some embodiments, such as in FIG. 9, a data center 900 may be viewed as a collection of shared computing resources and/or shared infrastructure. For example, as shown in FIG. 9, a data center 900 may include virtual machine slots 904, physical hosts 902, power supplies 906, routers 908, isolation zone 910, and geographical location 912. A virtual machine slot 904 may be referred to as a slot or as a resource slot. A physical host 902 may be shared by multiple virtual machine slots 904, each slot 904 being capable of hosting a virtual machine, such as a guest domain. Multiple physical hosts 902 may share a power supply 906, such as a power supply 906 provided on a server rack. A router 908 may service multiple physical hosts 902 across several power supplies 906 to route network traffic. An isolation zone 910 may service many routers 908, the isolation zone 910 being a group of computing resources that may be serviced by redundant resources, such as a backup generator. Isolation zone 910 may reside at a geographical location 912, such as a data center 900. A provisioning server 914 may include a memory and processor configured with instructions to analyze user data and rank available implementation resources using determined roles and shared resources/infrastructure in the calculation. The provisioning server 914 may also manage workflows for provisioning and deprovisioning computing resources as well as detecting health and/or failure of computing resources.

A provisioning server 914 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 902 that shares a router 908 with a second system may be more proximate to the second system than to a third system only sharing an isolation zone 910. Depending on an application, it may be desirable to keep the distance low to increase throughput or high to increase durability. In another embodiment, the distance may be defined in terms of unshared resources. For example, two slots 904 sharing a router 908 may have a distance of a physical host 902 and a power supply 906. Each difference in resources may be weighted differently in a distance calculation.

A placement calculation may also be used when selecting a prepared resource to transfer to a client account. In one embodiment, a client requests a virtual machine having an operating system. The provisioning server 914 may determine that the request may be satisfied with a staged volume in a slot 904. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 914 may determine that a placement near other existing volumes is desirable for latency concerns. Therefore, the decision may find that sharing a router 908 is desirable but sharing a supply 906 and physical host 902 is undesirable. A volume in the pool may then be selected that matches these attributes and placed preferably on a same router 908 as the other volumes but not the same physical host 902 or power supply 906. In other examples of placement decisions, such as those relating to a database shard, sharing of infrastructure may be less desirable and a volume may be selected that has less infrastructure in common with other related volumes.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments.

Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system configured to provide access to data in a provider network allocating virtualized computing resources to users of the provider network, the system comprising:
   at least one memory having stored therein computer instructions that, upon execution by one or more processors of the system, at least cause the system to:
      store network traffic flow data for the virtualized computing resources, wherein the network traffic flow data is based on data packets associated with a first subset of the virtualized computing resources;
      process the stored network traffic flow data for a time interval to determine network traffic flow data associated with a second subset of the virtualized computing resources; and
      publish the processed network traffic flow data associated with the second subset of virtualized computing resources to a user device associated with the second subset of the virtualized computing resources.

2. The system of claim 1, wherein the network traffic flow data for the virtualized computing resources is stored as a plurality of time-based grouping of data packets, and wherein the first subset of the stored network traffic flow data comprises at least one of the plurality of time-based groupings of data packets corresponding to the time interval.

3. The system of claim 1, wherein the computer instructions, upon execution by one or more processors of the system, at least cause the system to receive data indicative of a selection of the second subset of virtualized computing resources.

4. The system of claim 1, wherein the processing the stored network traffic flow data comprises identifying at least a portion of the stored network traffic flow data based on configuration information indicating data requested by a customer.

5. The system of claim 1, wherein the publishing is performed by a publisher component configured to filter and publish the network traffic flow data to one or more users associated with the second subset of virtualized computing resources.

6. The system of claim 1, wherein the publishing comprises making the processed network traffic flow data available to one or more of a monitoring service for the virtualized computing resources, a network flow analyzer, or a customer-defined storage.

7. The system of claim 1, wherein the second subset of virtualized computing resources comprise a virtual private network, a subnet, or a virtual network interface.

8. A method of providing network traffic flow data for a plurality of computing nodes communicating over a network, each of the plurality of computing nodes comprising a plurality of virtualized computing resources, the method comprising:
   storing network traffic flow data for the virtualized computing resources, wherein the network traffic flow data is based on data packets associated with a first subset of the virtualized computing resources;
   processing the stored network traffic flow for a time interval to determine network traffic flow data associated with a second subset of the virtualized computing resources; and
   publishing the processed network traffic flow data associated with the second subset of virtualized computing resources to a user device associated with the second subset of the virtualized computing resources.

9. The method of claim 8, wherein the network traffic flow data for the virtualized computing resources is stored as a plurality of time-based grouping of data packets, and wherein the stored network traffic flow data comprises at least one of the plurality of time-based groupings of data packets corresponding to the time interval.

10. The method of claim 8, wherein further comprising receiving data indicative of a selection of the second subset of virtualized computing resources.

11. The method of claim 8, wherein the processing the stored network traffic flow data comprises identifying at least a portion of the stored network traffic flow data based on configuration information indicating data requested by a customer.

12. The method of claim 8, wherein the publishing is performed by a publisher component configured to filter and publish the network traffic flow data to one or more users associated with the second subset of virtualized computing resources.

13. The method of claim 8, wherein the publishing comprises making the processed network traffic flow data available to one or more of a monitoring service for the virtualized computing resources, a network flow analyzer, or a customer-defined storage.

14. The method of claim 8, wherein the second subset of virtualized computing resources comprise a virtual private network, a subnet, or a virtual network interface.

15. A non-transitory computer-readable storage medium having stored thereon computer-readable instructions, the computer-readable instructions comprising instructions that upon execution on a computing node, at least cause:

storing network traffic flow data for virtualized computing resources of one or more computing nodes, wherein the network traffic flow data is based on data packets associated with a first subset of the virtualized computing resources;
processing the stored network traffic flow for a time interval to determine network traffic flow data associated with a second subset of virtualized computing resources; and
publishing the processed network traffic flow data associated with the second subset of virtualized computing resources to a user device associated with the second subset of the virtualized computing resources.

16. The non-transitory computer-readable medium of claim 15, wherein the network traffic flow data for the virtualized computing resources is stored as a plurality of time-based grouping of data packets, and wherein the stored network traffic flow data comprises at least one of the plurality of time-based groupings of data packets corresponding to the time interval.

17. The non-transitory computer-readable medium of claim 15, wherein the instructions upon execution on the computing node, at least cause receiving data indicative of a selection of the second subset of virtualized computing resources.

18. The non-transitory computer-readable medium of claim 15, wherein the processing the stored network traffic flow data comprises identifying at least a portion of the stored network traffic flow data based on configuration information indicating data requested by a customer.

19. The non-transitory computer-readable medium of claim 15, wherein the publishing is performed by a publisher component configured to filter and publish the network traffic flow data to one or more users associated with the second subset of virtualized computing resources.

20. The non-transitory computer-readable medium of claim 15, wherein the publishing comprises making the processed network traffic flow data available to one or more of a monitoring service for the virtualized computing resources, a network flow analyzer, or a customer-defined storage.

* * * * *